(12) United States Patent
Oliver (10) Patent No.: US 7,451,207 B2
(45) Date of Patent: Nov. 11, 2008

(54) PREDICTIVE PROVISIONING OF MEDIA RESOURCES

(75) Inventor: Neal C. Oliver, Florham Park, NJ (US)

(73) Assignee: Intel Corporation, Santa Clara, CA (US)

( * ) Notice: Subject to any disclaimer, the term of this patent is extended or adjusted under 35 U.S.C. 154(b) by 812 days.

(21) Appl. No.: 10/186,878

(22) Filed: Jun. 28, 2002

(65) Prior Publication Data

US 2004/0010582 A1 Jan. 15, 2004

(51) Int. Cl.
G06F 15/173 (2006.01)

(52) U.S. Cl. .................. 709/224; 709/225; 709/226

(58) Field of Classification Search .................. 709/224
See application file for complete search history.

(56) References Cited

U.S. PATENT DOCUMENTS

| | | | |
|---|---|---|---|
| 6,694,009 B1 * | 2/2004 | Anderson et al. ....... | 379/266.06 |
| 6,847,618 B2 * | 1/2005 | Laursen et al. ............. | 370/261 |
| 6,888,839 B1 * | 5/2005 | Scoggins et al. ............ | 370/410 |
| 2001/0055370 A1 * | 12/2001 | Kommer .................. | 379/88.01 |
| 2002/0156626 A1 * | 10/2002 | Hutchison ................ | 704/231 |
| 2003/0002481 A1 * | 1/2003 | Laursen et al. ............. | 370/352 |
| 2003/0091026 A1 * | 5/2003 | Penfield et al. ............ | 370/352 |
| 2003/0101053 A1 * | 5/2003 | Washio ...................... | 704/226 |
| 2004/0111269 A1 * | 6/2004 | Koch ......................... | 704/275 |

OTHER PUBLICATIONS

Manav Mishra, Erik Johnson, and K. M. Sivalingam, "Scheduling in Optical WDM Networks using Hidden Markov Chain-based Traffic Predictors", in IEEE International Conference on Networks, (Singapore), Sep. 2000. pp. 1-5.*
Web ProForum Tutorials. "Accelerating the Development of VoIP and VoATM", Telica. http://www.iec.org. The Interantiaonl Engineering Consortium ©. Pages 1-22.*
Megaco—An Emerging Call Control Standard for Multimedia Gateways.Whitepaper. RadiSys. Sep. 1999. (Whitepaper) pp. 1-12.*
Megaco—IP Phone Media Gateway Application Profile. rfc3054 [online] Jan. 2001. P. Blatherwick (Editor), Nortel Networks, R. Bell, Cicso Systems, P. Holland, Circa Communications. Jan. 2001. [retrieved Sep. 21, 2001]. Retrieved from the Internet: <URL: http://www.faqs.org/rfcs/rfc3054.html. pp. 1-11.*
Deroo, Olivier. A Short Introduction to Speech Recognition.. [online] [retrieved Sep. 18, 2001]. Retrieved from the Internet: <URL: http://www./tcts.fpms.ac.be/asr/introduction.html. pp. 1-9.*

(Continued)

*Primary Examiner*—John Follansbee
*Assistant Examiner*—Glenford Madamba
(74) *Attorney, Agent, or Firm*—Christopher K. Gagne (57) ABSTRACT

An apparatus and method are provided for predictive provisioning of functional packages based on offered traffic and a predictive model of the offered traffic. According to one embodiment of the invention, a managed agent provides predictions regarding an anticipated need for functional package provisioning based on traffic offered to the managed agent and a predictive model of offered traffic. A provisioning agent receives the predictions and in response to the predictions instructs the managed agent to provision a new functional package. According to another embodiment of the invention, the provisioning agent instructs a second managed agent to provision the media resource needed by the original managed agent. The traffic is then routed from the original man aged agent to the second managed agent.

22 Claims, 7 Drawing Sheets

OTHER PUBLICATIONS

Christensen, Sean; Professional Services. Voice Over IP Solutions. Whitepaper. Juniper Networks, Inc. © 2001. pp. 1-46.*

Enterprise Computer Telephony Forum (ECTF); Bringing Interoperability to Computer Telephony. Architecture Framework; revision 1.0. Enterprise Computer Telephony Forum © 1996, 1997. pp. i-44.*

* cited by examiner

PREDICTIVE PROVISIONING OF MEDIA RESOURCES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The invention relates generally to the provisioning of media resources. More particularly, the invention relates to predictive provisioning of media resources.

BACKGROUND OF THE INVENTION

Next-generation networks or Voice over IP (VoIP) have a variety of applications, from allowing telephone calls and facsimiles to be made over IP networks to being used as a framework for a Voice XML system. One next-generation network architecture is based on a gateway architecture utilizing media gateways, media gateway controllers, and signaling gateways. Media gateways have been used to implement media resources, such as Automatic Speech Recognition (ASR) resources, needed by applications such as a Voice XML system.

Media resources such as ASR, Text-to-Speech, Conference Bridge, and echo canceller resources are very large and complex and consume significant computing and storage resources. Provisioning a media gateway with an ASR resource requires not only loading the executable code into the gateway, but also grammars, special-purpose vocabularies, and acoustic models. In the past, a decision had to be made to either over-provision the media gateway with the functional packages, thus contributing greatly to the expense of the media gateway, or to risk having the ASR component not be available when needed.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus are described for performing predictive provisioning of functional packages based on offered traffic and a predictive model of the offered traffic. According to one embodiment of the present invention, a managed agent provides predictions regarding an anticipated need for functional package provisioning based on traffic offered to the managed agent and a predictive model of offered traffic. A provisioning agent receives the predictions and in response to the predictions instructs the managed agent to provision a new functional package. This allows predictive provisioning of the functional packages, thus maximizing functional package availability while minimizing over-provisioning of the managed agent.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention will be described with reference to a next-generation network utilizing media gateways and media gateway controllers, the method and apparatus described herein are equally applicable to other network technologies or future enhancements to the described next-generation network.

Terminology

Before describing an exemplary environment in which various embodiments of the present invention may be implemented, some terms that will be used throughout this application will briefly be defined.

The term next-generation network generally refers to an architecture that utilizes packet switching for Voice over IP (VoIP) traffic. The next-generation network has many possible applications, from allowing telephone calls and facsimiles to be made over IP networks to being used as a framework for Voice XML systems. The architecture can be based on the following components: media gateway controllers, media gateways, and signaling gateways. Media gateways and media gateway controllers can communicate with each other utilizing the International Telecommunication Union (ITU-T) H.248 standard.

A media gateway controller (MGC) typically communicates with other switching components and controls the operation of media gateways. A MGC is one example of a provisioning agent. The MGC can request that media streams be connected to terminations (an object that can either interconnect a media stream to another termination, or itself perform media operations on a media stream), that terminations be interconnected within a context, and that terminations perform media operations. It can behave as the "media application" with respect to a user on a call. The media gateway controller and signaling gateway may be implemented as a softswitch. A softswitch generally refers to software that provides the call control and signaling for the next-generation network.

A media gateway (MG) typically either interconnects media streams in different network or media formats (e.g., Real Time Protocol (RTP, T1/E1 TDM trunks) or monitors and controls the media endpoints, the media connections, and the media resources. A MG is one example of a managed agent. It can implement a set of terminations, which are endpoints into which physical or logical devices, such as station sets, trunks, lines, or RTP channels, are connected. A termination may implement media functions such as playing or detecting DTMF, playing messages, or recording messages. The media gateway may provide Automatic Speech Recognition (ASR) services. The H.248 protocol defines a base set of functionality supported by a termination required for basic voice response interaction. It also defines an extension mechanism called "packages" through which functionality can be requested. Vendors and other standards organizations are free to define proprietary packages, and media gateway vendors may choose to implement them. H.248 terminations and packages do not imply any implementation; they simply provide a syntax by which requests may be sent from a media gateway controller to a media gateway.

A media resource generally refers to an arrangement of hardware and software that implements a media processing algorithm. Media gateways can use media resources to perform their functions. In particular, H.248 terminations and contexts are implemented by allocation and interconnection of media resources, and by requesting operations on media resources that correspond to H.248 signals.

Many types of media processing algorithms exist, but in particular it is common to consider the following media resources:

Convert media objects stored in a file into a media stream on a channel, encoded in some appropriate form (i.e., a "Player").

Convert a media stream into a media object stored on a disk (i.e., a "Recorder").

Recognize DTMF signals embedded in a media stream (i.e., "Signal Detector").

Inject DTMF signals into a media stream (i.e., "Signal Generator");

Recognize speech from a media stream (i.e., "Automatic Speech Recognition" (ASR)); an ASR may in turn be separated into an "ASR Front-End" resource, that converts a media stream into a stream of speech-related feature vectors, and an "ASR Back-End" resource that performs recognition algorithms on a stream of feature vectors.

Convert a text string into a speech signal and inject it into a media stream (i.e., "Text-to-Speech" (TTS) resource).

Perform echo cancellation on a media stream (i.e., "Echo Cancellation" (EC) resource).

Perform an acoustic summation of multiple input streams and provide the resulting output stream to multiple media channels (i.e., "Conference Bridge" resource).

Media resources vary in the complexity of implementation; some resources, such as ASRs, TTSs, conference bridges, and echo cancellers, are expensive. Therefore large media servers and media gateways that support many users must allocate them in a statistical manner so as to find a balance between system cost and ability to support users.

A media server generally refers to an ensemble of hardware and software that allows multiple user sessions, each under the control of a separate application program, to share the media resources under the management of the media server. A media server can allow an individual application program to handle an individual call without needing to take notice of other calls that may be in progress at the media server. Media servers may be proprietary in architecture, or they may conform to a standard, such as that of the Enterprise Computer Telephony Forum (ECTF), which defines service-level application programming interfaces (APIs), a control plane interface for controlling and monitoring media resources, and management APIs and management information bases (MIBs) for administration.

An automatic speech recognition (ASR) resource generally refers to a media resource that accepts as input a media stream, and, in response to control requests, recognizes spoken language utterances, returning text strings and probability scores. The functions of an ASR resource may be divided into "front-end" and "back-end" resources. ASR front-end receives a media stream corresponding to the speech of a user and processes the media stream with respect to a speech model to transform it into an encoding suitable for use in a speech parser, keyword spotter, or other ASR back-end component. An ASR back-end receives the output of the ASR front-end. It then applies ASR components to make a hypothesis recognizing the speech of the user. ASR components comprise grammars, vocabularies, and acoustic models.

An echo canceller (EC) resource generally refers to a resource that accepts as input an input media stream and a reference media stream, and generates as output an "echo-cancelled" media stream in which any time-shifted occurrences of the reference media stream have been acoustically subtracted from the input media stream.

A conference bridge (CB) resource generally refers to a media resource that accepts as input multiple input media streams, and generates as output a collection of media streams consisting of the acoustic sum of the input streams.

A queuing model generally refers to a mathematical object consisting of a queue into which objects arrive, a server which dequeues an object from the front of the queue and performs a service on it, an arrival probability distribution that characterizes the rates at which objects arrive at the queue, and a service time distribution that characterizes the time required to perform a service on an object. A common use of a queuing model is to model a communications system; the objects arriving at the queue are calls, which have typically a Poisson arrival probability distribution; the service time distribution represents the length of a call, which is typically also modeled as an exponential probability distribution. The queuing model may be used to predict the number of calls active and/or queued at a telecommunications system.

A Markov Model (or Markov Chain) generally refers to a mathematical object consisting of a collection of states, a collection of allowed transitions between states, an assignment of probabilities to the transition, and an output (or set of possible outputs) corresponding to each state. Markov Models are used to model a very wide variety of physical processes. The Markov Model can be represented graphically or as an N×N matrix $A=\{a_{ij}\}$ in which the ij-th entry represents the probability of transitioning from state i to state j.

A Hidden Markov Model (HMM) generally refers to a Markov Model with two additional characteristics: the observable outputs of a state are not deterministic, but are themselves a probabilistic function of the state (represented as an N×M matrix $B=\{b_{ij}\}$ in which each entry represents the probability of output j in state i), and the output probabilities and transition probabilities are not known a priori, but can be inferred only from observing output sequences generated by the real-world process of which the HMM is a model. There are well-known algorithms for estimating the transition and output probabilities (e.g., Baum-Welch re-estimation), for computing the probability that an observed output sequence was generated by a given HMM (e.g., forward/backward evaluation), and for identifying the most likely state sequence for an observed output sequence (e.g., Viterbi search).

A probability distribution corresponding to a Markov Model generally refers to the set of probabilities $p_i$ of the model being in a particular state i. The set of probabilities is usually written as a vector $\pi=(p_1, p_2, \ldots, p_n)$ An initial probability distribution $\pi^{(0)}$ is the set of probabilities before a Markov model begins its operation, and with each step of the model, successive probability distributions $\pi^{(1)}, \pi^{(2)}, \ldots$, are generated. These probability distributions can be computed by the matrix multiplication $$\pi^{(k)} = \pi^{(0)} \times A^k$$

where A is the transition matrix.

A stationary distribution (SD) corresponding to a Markov Model generally refers to the long-run (or the limit) probability distribution π of a given Markov Model. If a model runs for a long enough time for its transient behavior to vanish, the individual $p_i$ values correspond to the proportion of time that the model spends in state i. Not all Markov Models have a stationary distribution, but the ones of interest for this invention do. There are various numerical procedures for computing the SD of a Markov model.

Provisioning System

Figure 1:
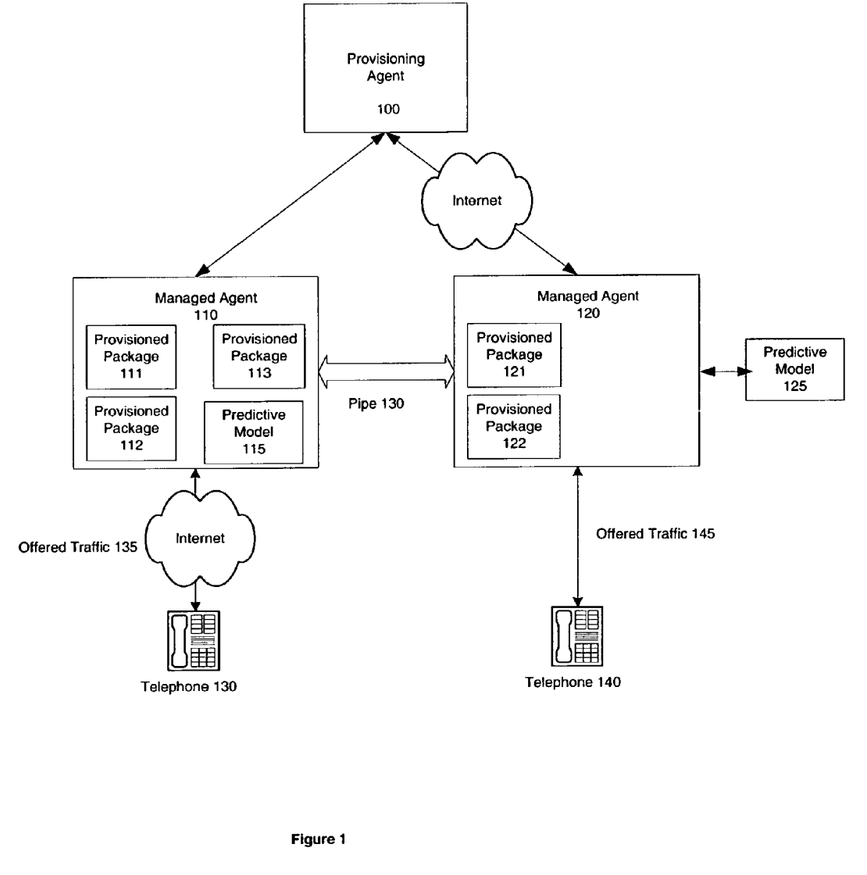
FIG. 1 is a block diagram illustrating a provisioning system according to one embodiment of the present invention.

FIG. 1 illustrates a provisioning system according to one embodiment of the present invention. A provisioning agent 100 is communicatively coupled to a managed agent 110 and a managed agent 120. Managed agent 110 is directly coupled to the provisioning agent 100. Managed agent 120 is communicatively coupled to the provisioning agent 100 through the Internet. It should be appreciated that alternate communication couplings are possible. A pipe 130 may be set up to route traffic from managed agent 110 to managed agent 120.

Managed agent 110 is provisioned with functional packages 111, 112, and 113. Managed agent 120 is provisioned with functional packages 121, and 122. Functional packages 111-113, 121, and 122 may contain various combinations of Automatic Speech Recognition (ASR) resources, text-to-speech resources, or other media resources that need to be monitored. Each managed agent 110, 120 has access to a predictive model 115, 125 which models the usage of the resources provisioned in the management agents 110, 120. The predictive model 115 resides directly on managed agent 110. The predictive model 125 is remotely accessible to managed agent 120. For example, predictive model 125 may reside on an attached storage device, another managed agent, the provisioning agent 100, or another device communicatively coupled to managed agent 120. According to one embodiment of the invention, the predictive models 115, 125 may consist of a queuing model, which measures the arrival and service times of calls arriving at the managed agent, and computes the parameters of the arrival and service time distributions; and a resource allocation model that models the stream of resource allocation and deallocation requests made of the managed agent.

Telephone 130 is communicatively coupled to managed agent 110 through the Internet. It provides offered traffic 135 to managed agent 110. Telephone 140 is directly coupled to managed agent 120. It provides offered traffic 145 to managed agent 120. It should be appreciated that alternate couplings are possible. For example, the offered traffic 135, 145 may be routed through a Public Switched Telephone Network (PTSN). It should also be appreciated that offered traffic 135, 145 could originate from alternate sources, such as a computer system.

According to one embodiment of the invention, the managed agents 110, 120 provide predictions to the provisioning agent 100 on functional packages the managed agents anticipate they will need in order to process offered traffic 135, 145. These predictions may be based on offered traffic 135, 145 and the predictive models 115, 125. The managed agents 110, 120 may also adapt the predictive models 115, 125 based on the offered traffic 135, 145. It should be appreciated that in alternate embodiments, the managed agents 110, 120 may be provided with static predictive models, may train the models for a limited period of time after which the models remain static, or may use the queuing model and resource allocation model within the predictive model to compute different statistics.

The provisioning agent 100 may instruct the requesting managed agent 110, 120 to provision the needed functional package to provide different numbers or combinations of resources. If the requesting managed agent 110, 120 cannot provision the requested resources, the functional package may be provisioned in an alternate managed agent. The provisioning of alternate managed agents will be described in further detail in reference to FIGS. 6 and 7.

An Exemplary Provisioning/Managed Agent

Figure 2:
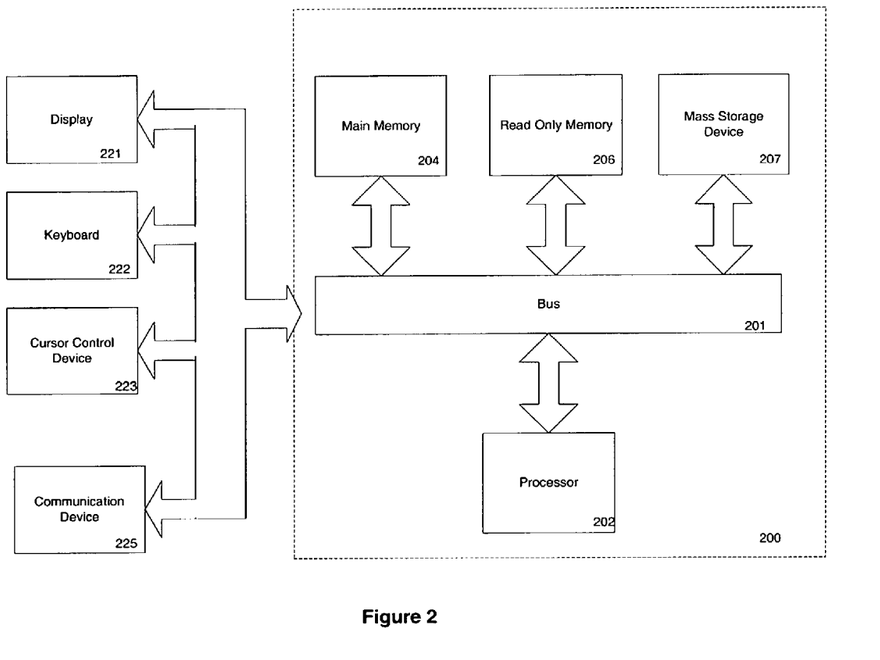
FIG. 2 is an example of a typical computer system upon which components of one embodiment of the present invention can be implemented.

A computer system 200 representing an exemplary provisioning agent 100 or managed agent 110,120 in which features of the present invention may be implemented will now be described with reference to FIG. 2. Computer system 200 comprises a bus or other communication means 201 for communicating information, and a processing means such as a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to computer system 200 for storing information and instructions. Computer system 200 can also be coupled via bus 201 to a display device 221, such as a cathode ray tube (CRT) or Liquid Crystal Display (LCD), for displaying information to a computer user. Typically, an alphanumeric input device 222, including alphanumeric and other keys, may be coupled to bus 201 for communicating information and/or command selections to processor 202. Another type of user input device is cursor control 223, such as a mouse, a trackball, or cursor direction keys for communicating direction information and command selections to processor 202 and for controlling cursor movement on display 221.

A communication device 225 is also coupled to bus 201 for access to the network, such as LAN 100. The communication device 225 may include a modem, a network interface card, or other well-known interface devices, such as those used for coupling to an Ethernet, token ring, or other types of networks. In any event, in this manner, the computer system 200 may be coupled to a number of clients and/or servers via a conventional network infrastructure, such as a company's Intranet and/or the Internet, for example.

It should be appreciated that this invention is not limited to the computer system described in this example. In alternative embodiments, the provisioning agent and/or managed agent may also comprise various combinations of computers, processors, other hardware devices, software processes, or other software objects. The provisioning agent and/or managed agent may also be coupled to alternate network infrastructures, such as a wireless network. Additionally, the provisioning agent and managed agent may be implemented on the same computer system.

Provisioning System in a Next-Generation Network

According to one embodiment of the present invention, the predictive provisioning may be performed in a next-generation network utilizing media gateways and media gateway controllers, which in turn use media resources to perform their functions. Resources that are particularly suitable for predictive provisioning in a next-generation network are ASR, TTS, echo cancellation, and conference bridge resources, because of their cost and computational complexity. Predictive provisioning of such components in a next-generation network will now be illustrated with reference to FIG. 3. The illustration will restrict itself to the provisioning of ASR resources, but it will be appreciated that the same process applies to TTS, echo cancellation, conference bridge, and other costly and/or computationally expensive resources.

Figure 3:
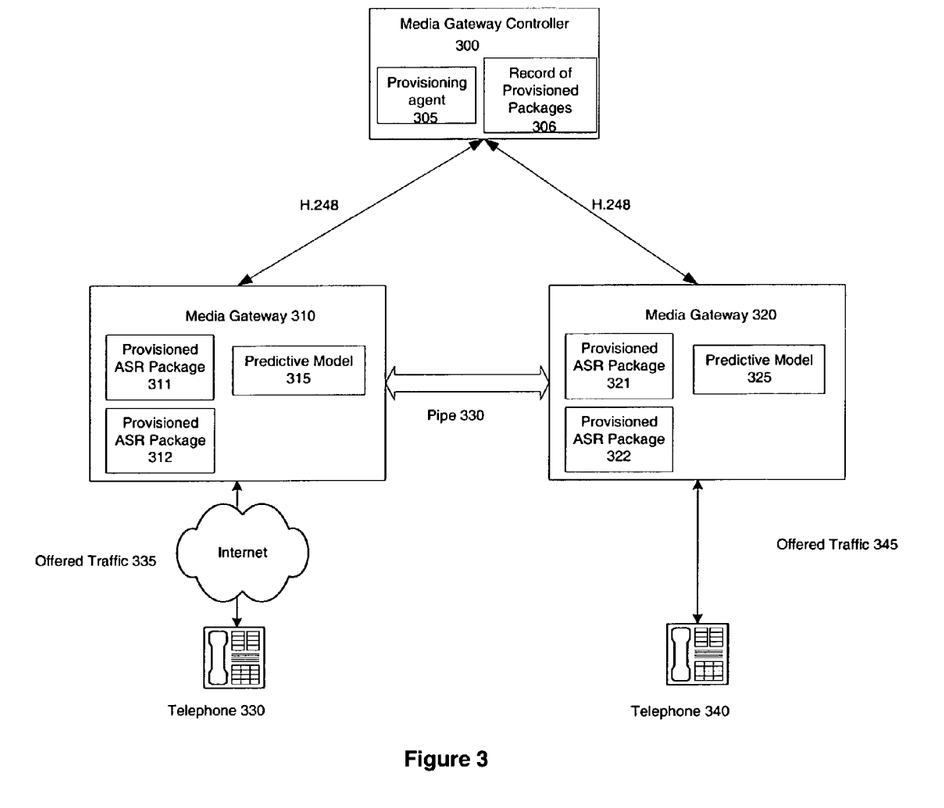
FIG. 3 is a block diagram illustrating a provisioning system in a next-generation network according to one embodiment of the present invention.

A media gateway controller 300 is communicatively coupled to media gateways 310, 320 using the International Telecommunication Union (ITU-T) H.248 standard. It should be appreciated that media gateway controller 300 may be implemented as a soft switch. Media gateway 310 is provisioned with ASR packages 311, 312. Media gateway 320 is provisioned with ASR packages 321, 322. In one embodiment, media gateways 310, 320 may be media servers, according to the Enterprise Computer Telephony Forum (ECTF) standard for telephony servers. A pipe 330 may be set up to route traffic from media gateway 310 to media gateway 320.

A provisioning agent 305 resides on the media gateway controller 300. The media gateway controller 300 keeps a record 306 of the provisioned ASR packages 311, 312, 321, and 322 residing on the media gateways 310, 320 that are under the control of the media gateway controller 310. In alternate embodiments the media gateway controller may not keep this record 306 or the record 306 may be a part of the provisioning agent 305.

Media gateways 310, 320 each maintain a predictive model 315, 325 consisting of a queuing model of calls offered to the media gateways 310, 320 and resource allocation models of the resources requested for use by calls arriving at media gateways 310, 320. According to one embodiment of the invention, the queuing model records the arrival time of a call from telephones 330, 340 to their media gateways 310, 320. When the call eventually terminates, the queuing model records the completion time of the call. The duration of the call is used to update the average holding time of the call in the queuing model. The number of calls arriving at media gateways 310, 320, and the intervals between their arrivals is used to update the arrival probability distribution of the queuing model.

As the media gateways 310, 320 performs media operations on behalf of the users of telephones 330, 340, they make requests of the media gateway controller 300 to perform media operations. Each such request is called a transaction. Some of the transactions are media resource allocation or deallocation requests, which include the type of a media resource (e.g., ASR) and other attributes (e.g., English Vocabulary, Banking Grammar). The resource allocation model may be a HMM where:

the state transition matrix A models each transaction as a state transition;

The output of the states consists of symbols that either represent <ResourceOperation> (a single symbol) or <allocationtype, resourcetype, vocabulary, grammar>, which is a composite symbol composed of the allocation type (i.e., whether a resource is being allocated or deallocated), resource type (e.g., ASR), vocabulary type (an identifier of a vocabulary object provisioned in the managed agent), and grammar type (an identifier of a grammar object provisioned in the managed agent). If a resource type does not require a vocabulary or grammar (e.g., Players, Recorders, Echo Cancellers, Conference Bridges), the values of vocabulary and grammar may be set uniformly to "0".

The output probability matrix B represents the probability of a symbol corresponding to a media operation or resource allocation/deallocation request.

The HMM may be parameterized in terms of at one or more of resource type, attributes, grammars, and vocabularies. It may be trained by collecting observation sequences of media operations and allocation/deallocation requests for each call arriving at the media gateways 310, 320. During the training phase, this data is collected and periodically an HMM training algorithm is performed on the data, resulting in a trained transition matrix A and output probability matrix B.

The predictive models 315, 325 may use the trained transition matrix A to compute an expected number of occurrences of <allocationtype, resourcetype, vocabulary, grammar> for each symbol. This may be computed as follows:

The stationary distribution $\Pi=(\pi_1, \pi_2, \ldots, \pi_n)$ is computed from A. Each entry $\pi_i$ represents the average percentage of time between visits to each state i. This vector is multiplied by the average number of transactions in a call (a statistic measured by the resource allocation model) to compute $E = (e_1, e_2, \ldots, e_n)$, the expected number of visits to each state during a call.

The output distribution $B=\{b_{ij}\}$ represents the probability that symbol j is observed in state i. The expected number of allocation requests R for each resource type during a call is $R=E \times B$.

The expected number of allocation requests for each <resource, vocabulary, grammar> tuple are those entries in R that correspond to allocation requests. These entries of R are collected into a vector S.

The expected number of resources needed by a managed agent are T=cS, where c is the number of calls active in the managed agent as computed by the queuing model, and S is the vector of expected number of allocated resources in the managed agent. Thus T=($t_1, t_2, \ldots, t_m$) is a prediction of the expected number of resources used by calls arriving at a managed agent.

The predictive models 315, 325 may be trained for a period of time by the media gateways 310, 320 and then remain static. The models 315, 325 may be initialized with each path having an equal probability, known probabilities, or estimated probabilities. Alternately the models 315, 325 may be periodically updated using measurements collected during operation or the models 315, 325 may be static models that cannot be adapted.

Telephone 330 is communicatively coupled to media gateway 310 through the Internet. It provides offered traffic 335 to media gateway 310. Telephone 340 is directly coupled to media gateway 320. It provides offered traffic 345 to media gateway 320. In one embodiment, the offered traffic may correspond to the utterances of users using an Interactive Voice Response (IVR) system, and the responses of the IVR system.

According to one embodiment of the invention, the media gateways 310, 320 provide predictions to the media gateway controller 300 on ASR resources that the the media gateways 310, 320 anticipate they will need in order to process offered traffic 335, 345. These predictions may be based on offered traffic 335, 345 and the predictive models 315, 325.

The media gateway controller 300 may instruct the media gateways 310, 320 to provision the needed ASR package. If the requesting media gateway 310, 320 does not have sufficient resources to provision the needed ASR package, the ASR package may be provisioned in an alternate media gateway. The provisioning of alternate media gateways will be described in further detail in reference to FIGS. 6 and 7.

Interactive Voice Response (IVR) System

Figure 4A:
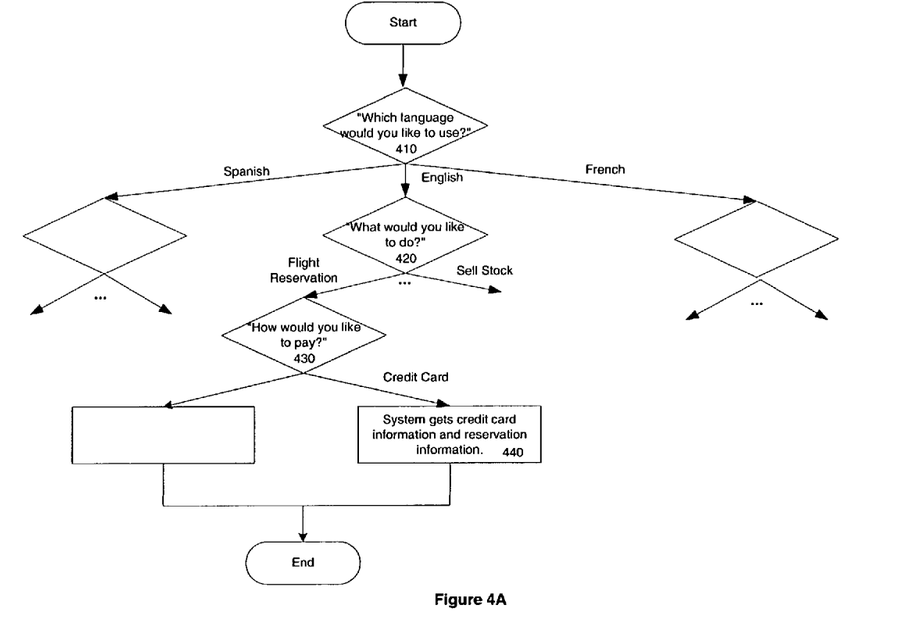
FIG. 4A illustrates an exemplary interactive voice response system, which utilizes predictive provisioning according to one embodiment of the present invention.

An exemplary IVR system utilizing predictive provisioning will now be described with reference to FIGS. 4A and 4B. FIG. 4A illustrates one interaction a user could have with the IVR system. The IVR system could reside in a media application program that resides on a media gateway controller. In the course of execution of this program, the media gateway will request the use of one or more packages in the media gateway. The media gateway, in turn, will require the use of media resources in order to accomplish the requested operations, and will issue requests to allocate these resources.

Figure 4B:
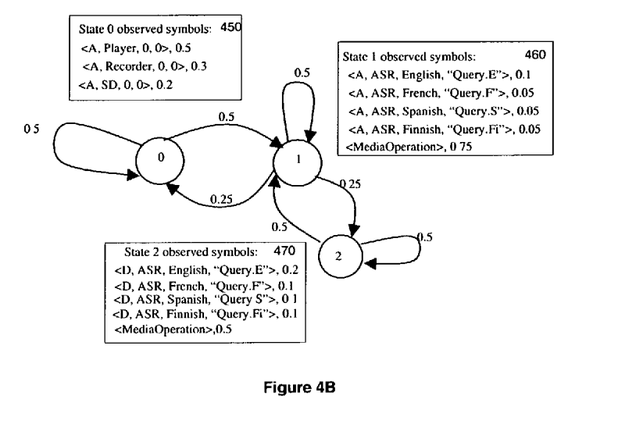
FIG. 4B is an exemplary Hidden Markov Model representation of the resource allocation model that might apply to the voice response system of FIG. 4A.

FIG. 4B represents an exemplary resource allocation model maintained by the media gateway. The model contains three states 0, 1, 2. State 0 has a 0.5 probability of transitioning to state 1 and a 0.5 probability of looping back to itself. State 1 has a 0.5 probability of looping back to itself, a 0.25 probability of transitioning to State 2, and a 0.25 probability of transitioning to State 0. State 2 has a 0.5 probability of looping back to itself, and a 0.5 probability of looping to State 0. It should be appreciated that the number of states is variable. Different implementations or different systems may utilize more or fewer states than that illustrated in FIG. 4B. It should also be appreciated that the state transition probabilities are only exemplary in nature. They may be trained by the model and updated periodically during the training period.

Each state has a set of observed symbols 450, 460, 470. The observed symbols 450 are associated with state 0 and consist of allocating a player, which has a probability of 0.5; allocating a recorder, which has a probability of 0.3; and allocating a signal detector, which has a probability of 0.2. The observed symbols 460 are associated with state 1 and consist of allocating an ASR package with an English vocabulary and a "Query.E" grammar, which has a probability of 0.1; allocating an ASR package with a French vocabulary and a "Query.F" grammar, which has a probability of 0.05; allocating an ASR package with a Spanish vocabulary and a "Query.S" grammar, which has a probability of 0.05; allocating an ASR package with a Finish vocabulary and a "Query.Fi" grammar, which has a probability of 0.05; and performing a Media Operation, which has a probability of 0.75. The observed symbols 470 are associated with state 2 and consist of deallocating an ASR package with an English vocabulary and a "Query.E" grammar, which has a probability of 0.2; deallocating an ASR package with a French vocabulary and a "Query.F" grammar, which has a probability of 0.1; deallocating an ASR package with a Spanish vocabulary and a "Query.S" grammar, which has a probability of 0.1; deallocating an ASR package with a Finish vocabulary and a "Query.Fi" grammar, which has a probability of 0.1; and performing a media operation, which has a probability of 0.5. It should be appreciated that the number of output symbols may be determined by the number of distinct media resources provisioned in the media gateway. Other HMM models may have different types and numbers of symbols associated with each state. It should also be appreciated that the symbol output probabilities are only exemplary in nature. They may be trained by the model and updated periodically during the training period.

As the program flow of FIG. 4A proceeds, the media gateway may first configure a default package consisting of a player and signal detector—sufficient resources to play a prompt and receive a reply. The media gateway may then allocate the Player and SD resources, which correspond to a transition from state 0 to state 1 in the HMM. The IVR program then issues a prompt 410 to determine the language in which the conversation is to ensue, giving the user a choice of English, French, and Spanish. The program may then receive a DTMF response for English, and identifies English as the language to be used.

Next, the program may need to configure a package with ASR for the language chosen by the user and a grammar needed for the next phase of the conversation. In this case, the next phases of the conversation ask the user what he or she would like to do 420 and how he or she would like to pay 430. Therefore, there may be another state transition in FIG. 4B from state 1 to state 2, and another observed output consisting of the allocation of an ASR package with an English vocabulary and a "Query.E" grammar. This package allows the program to get the credit card and reservation information from the user in block 440. Because the program flow of the media application may be modeled by the corresponding HMM, over time the transition and output probabilities of the HMM may reflect the global behavior of the application program when used by many users. This may then give a more accurate prediction of the expected number of resources and resource types needed by the media gateway.

Media Gateway Provisioning

Figure 5:
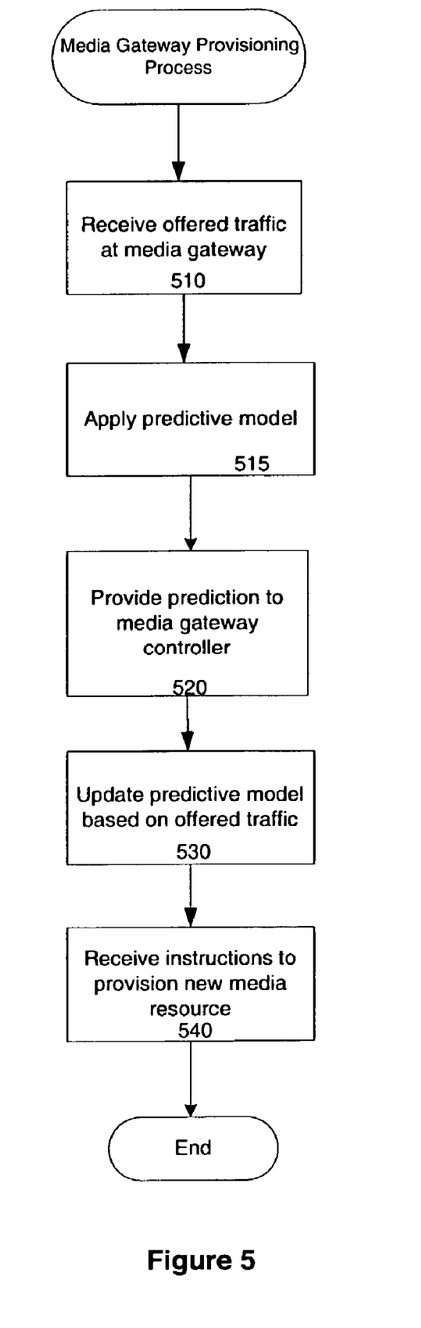
FIG. 5 is a flow diagram that illustrates a media gateway provisioning process according to one embodiment of the present invention.

Media Gateway provisioning process according to one embodiment of the present invention will now be described with reference to FIG. 5. At block 510, offered traffic is received at the media gateway. This offered traffic may correspond to the utterances of users using an IVR system.

At block 515, the media gateway will apply a predictive model to the offered traffic to determine if it anticipates it will need any media resources. This predictive model may be a model like one described above, or may be another type of stochastic model. At block 520, the media gateway provides a prediction to the media gateway controller regarding an anticipated need for a media resource. This prediction may be based on the offered traffic and the predictive model.

At block 530, the media gateway updates the predictive model based on the offered traffic. It should be appreciated that this block is optional. In alternate embodiments, the predictive model may be a static model or it may be a model that initially underwent a training period where modifications were made, but now it is static. It should also be appreciated that block 530 may be performed before block 520. At block 540, the media gateway receives instructions from the media gateway controller to provision the media resource.

Provisioning Alternate Media Gateway

Figure 6:
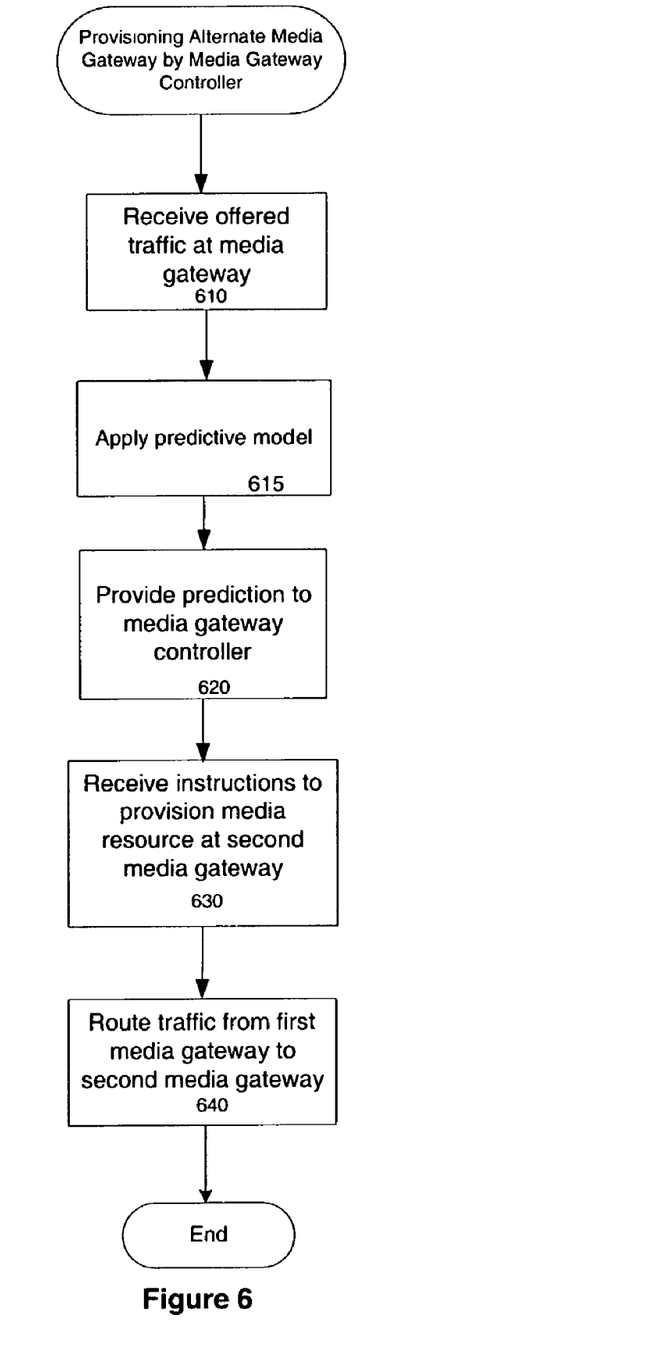
FIG. 6 is a flow diagram illustrating provisioning an alternate media gateway by a media gateway controller according to one embodiment of the present invention.
Figure 7:
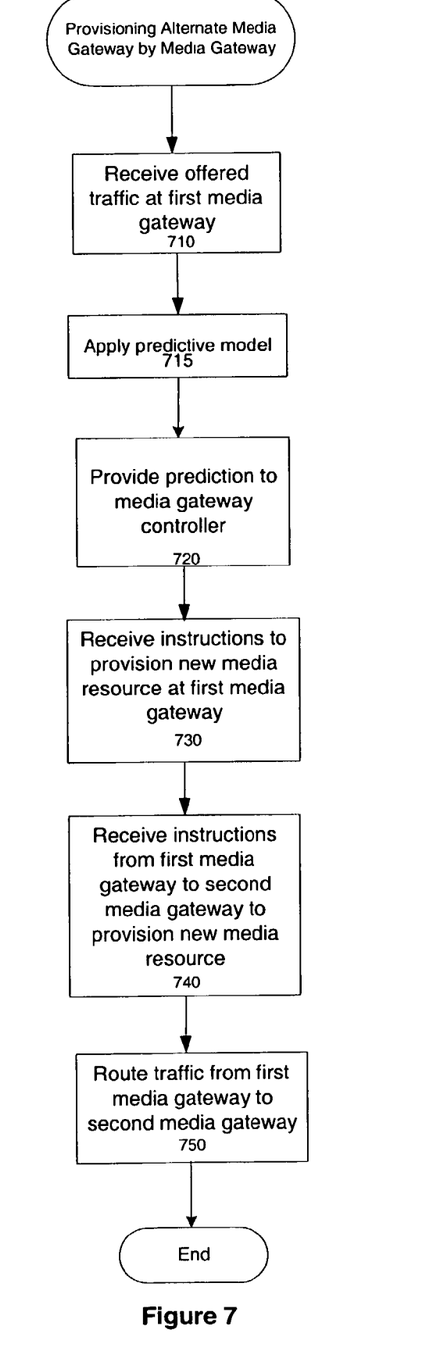
FIG. 7 is a flow diagram illustrating provisioning an alternate media gateway by a media gateway according to one embodiment of the present invention.

According to one embodiment of the present invention, there may be occasions when an alternate media gateway may be selected to provision a media resource needed by another media gateway. For instance, this may happen when the expected resource utilization of a media gateway exceeds the number of actual resources available for use in a media gateway. In this case, an additional media gateway, with its own set of media resources, may be used to service calls. Provisioning of alternate media gateways may be done by the predicting media gateway or may be done by the media gateway controller. FIG. 6 illustrates provisioning of an alternate media gateway by the predicting media gateway. FIG. 7 illustrates provisioning of an alternate media gateway by the media gateway controller.

At blocks 610, 710 offered traffic is received at a media gateway. At blocks 615,715, the media gateway applies a predictive model to the offered traffic to determine the new expected numbers of media resources. At blocks 620, 720, the media gateway provides a prediction to the media gateway controller regarding an anticipated need for a media resource. This prediction may be based on the offered traffic and the predictive model.

At block 630, the media gateway controller issues instructions to a second media gateway to provision the package needed by the predicting media gateway. The media gateway controller may make the determination to provision an alternate media gateway based on records it keeps or it may be informed by the predicting media gateway that the predicting media gateway is not able to provision the new media resource. At block 640, the media gateway controller routes traffic from the predicting media gateway to the alternate media gateway. It should be appreciated that the means used to route the traffic is not important. For instance, traffic may be routed directly to the alternate media gateway, routed through a pipe from the predicting media gateway to the alternate media gateway, or some other mechanism may be used.

Alternately, the media gateway may itself issue instructions to an alternate media gateway to provision the required media resource. At block 730, the predicting media gateway receives instructions to provision the media resource. At block 740, the predicting media gateway issues instructions to an alternate media gateway to provision the media resource. The predicting media gateway then routes traffic from itself to the alternate media gateway in block 750. This may be accomplished by a pipe or some alternate routing means.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system comprising:
 a first managed agent coupled to a communications terminal that offers communications traffic to the managed agent, the managed agent processing the offered traffic using base media functionality in the form of a first set of one or more functional packages, the first managed agent to process the offered traffic using the first set of functional packages and to provide predictions regarding an anticipated need for provisioning additional functional packages that are not in the first set of functional packages based on the offered traffic and a predictive model of offered traffic, the additional functional packages providing additional media functionality for processing the offered traffic; and
 a provisioning agent to receive the predictions from the first managed agent and in response to the predictions to instruct the first managed agent to provision a new functional package from among the additional functional packages
 wherein the first managed agent uses the newly provisioned functional package to process the offered traffic.

2. The system of claim 1, wherein the first managed agent is further to adapt the predictive model based on the offered traffic.

3. The system of claim 1, wherein the functional packages comprise one or more of Automatic Speech Recognition (ASR) resources, Text-to-Speech (TTS) resources, Echo Canceller (EC) resources, and Conference Bridge (CB) resources.

4. The system of claim 3, wherein the predictive model is parameterized in terms of at least one of resource type, attributes, grammars, and vocabularies.

5. The system of claim 1, further comprising a second managed agent, the second managed agent including a second set of one or more functional packages.

6. The system of claim 1, further comprising a pipe to route offered traffic from the first managed agent to the second managed agent, and wherein the second managed agent provisions the new functional package.

7. The system of claim 1, wherein the first managed agent comprises a media gateway.

8. The system of claim 1, wherein the provisioning agent comprises a media gateway controller.

9. The system of claim 8, wherein the media gateway controller comprises a softswitch.

10. The system of claim 1, wherein the predictive model comprises a queuing model to model call arrival and holding time, and a Hidden Markov Model (HMM) to model resource allocation, deallocation and operation.

11. A media gateway controller comprising:
 in memory, a provisioning agent to receive predictions from a media gateway that is coupled to at least one communications terminal that offers communications traffic to the media gateway, the media gateway requiring media resources in the form of functional packages to process the offered traffic, the predictions regarding an anticipated need for one or more additional media resources to process traffic offered to the media gateway, the predictions being based on observing the offered traffic: and a predictive model, and in response to the predictions to instruct the media gateway to provision the one or more additional media resources for use in processing the offered traffic at the media gateway.

12. The media gateway controller of claim 11, wherein the media resources comprise one or more of Automatic Speech Recognition (ASR) resources, Text-to-Speech (TTS) resources, Echo Canceller (EC) resources, and Conference Bridge (CB) resources.

13. The media gateway controller of claim 11, further comprising one or more records of the provisioning state of media gateways under the control of the media gateway controller.

14. A media gateway comprising:
 a connection for traffic communication with one or more communications terminals that offer traffic for processing by the media gateway;
 a queuing model of traffic offered to the media gateway;
 one or more media resources for use in processing the traffic offered by the communications terminals; and
 a resource allocation model to model resource allocation, deallocation, and operation;
 wherein the media gateway provides predictions to a media gateway controller regarding an anticipated need for one or more additional media resources for use in processing traffic offered by the communications terminals, the predictions based on the queuing model and the resource allocation model.

15. The media gateway controller of claim 14, wherein the media resources comprise one or more of Automatic Speech Recognition (ASR) resources, Text-to-Speech (TTS) resources, Echo Canceller (EC) resources, and Conference Bridge (CB) resources.

16. The media gateway controller of claim 15, wherein the resource allocation model is parameterized in terms of at least one of resource type, attributes, grammars, and vocabularies.

17. A method comprising:
 observing traffic offered to a media gateway by communications terminals, the offered traffic including communications packets requiring functional packages for processing by the media gateway, the media gateway having a first set of one or more provisioned functional packages for processing the offered traffic; and
 proactively provisioning the media gateway with additional functional packages for use by the media gateway to process the offered traffic in response to the offered traffic and a predictive model of offered traffic.

18. The method of claim 17, further comprising modifying the predictive model based on the offered traffic.

19. The method of claim 17, wherein the proactively provisioning comprises proactively provisioning the media gateway with one or more Automatic Speech Recognition (ASR) resources.

20. A method comprising:
 receiving offered traffic at a first managed agent from communications terminals, the offered traffic including communications packets requiring media resources for processing by the managed agent, the managed agent having a first set of one or more provisioned media resources for processing the offered traffic; and
 providing a prediction of a required additional media resource required to process offered traffic from a communications terminal based on the offered traffic and a predictive model of offered traffic, the predictive model anticipating needs for additional media resources.

21. The method of claim 20, wherein the first managed agent comprises a media gateway and the media resources comprise one or more of Automatic Speech Recognition (ASR) resources, Text-to-Speech (TTS) resources, Echo Canceller (BC) resources, and Conference Bridge (CB) resources.

22. The method of claim 20, further comprising:
 provisioning the functional package at a second managed agent; and
 routing traffic from the first managed agent to the second managed agent.

* * * * *